United States Patent Office 3,340,043
Patented Sept. 5, 1967

3,340,043
METHOD FOR PREVENTING PLANT GROWTH
John F. Olin, Ballwin, Mo., assignor to Monsanto Company, a corporation of Delaware
No Drawing. Original application Aug. 28, 1961, Ser. No. 134,159. Divided and this application June 14, 1963, Ser. No. 293,555
5 Claims. (Cl. 71—118)

This application is a division of application Ser. No. 134,159, filed Aug. 28, 1961, now abandoned.

This invention relates to the control of plant systems, including germinating seeds and emerging seedlings. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain solely ortho-substituted α-haloacetanilides as new compounds.

In recent years, the use of chemicals for affecting plant systems has found wide-spread acceptance among agriculturalists. For example, chemical compositions have been applied to fully developed vegetation to destroy the same in either a selective or non-selective manner. It is relatively easy to destroy the aerial portion of developed vegetation because the vegetation is brought into direct contact with the herbicide composition; however, it is sometimes more difficult to achieve a lethal affect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately, it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

Very useful herbicidal compositions containing certain nuclear-substituted and nitrogen-substituted α-haloacetanilides are disclosed and claimed in U.S. Patent 2,863,752, issued to Hamm and Speziale. They discovered that the α-haloacetanilides required in alkyl substitutents of up to 6 carbon atoms on the amide nitrogen atom and an alkyl substituent of up to 4 carbon atoms on the aromatic ring in order to produce herbicidal activity. Even though these α-haloacetanilides of Hamm and Speziale are very effective herbicides, it is desirable in man's continued battle with undesirable plant life to improve the effectiveness of these herbicidal compositions.

I have now discovered, much to my surprise, that the unit activity of an α-haloacetanilide with respect to broadleaf plants is decreased in comparison to the unit activity with respect to grass plants by substituting only a single alkyl radical, limited to a tertiary alkyl radical, on the aromatic ring in only the ortho position with respect to the amide nitrogen atom, and not substituting any other substituents on either the aromatic ring or the amide nitrogen atom. Thus, the newly discovered α-haloacetanilides are more selective in preventing the growth of grass plants than broadleaf plants.

An object of this invention is to provide novel herbicidal compositions containing as an essential ingredient an α-haloacetanilide having a single tertiary alkyl substituents substituted on the aromatic ring in the ortho position with respect to the amide nitrogen atom.

Another object of this invention is to provide novel herbicidal compositions having high unit activity for certain plant species.

Another object of this invention is to provide novel herbicidal compositions which exhibit selectivity in affecting certain undesirable plant systems without affecting desirable plant systems.

Another object of this invention is to provide methods for the suppression and control of undesirable vegetation growing inter-mingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain α-haloacetanilides having a single tertiary alkyl radical substituted on the aromatic ring ortho with respect to the amide nitrogen atom.

Other aspects, objects, and advantages of this invention will be apparent from a consideration of the accompanying disclosure and the appended claims.

According to the present invention, there are provided herbicidal concentrate compositions comprising an herbicide adjuvant and an α-haloacetanilide of the formula

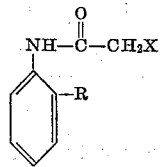

wherein R is a tertiary alkyl radical having at least 4 carbon atoms and X is an halogen atom selected from the group consisting of chlorine, bromine, and iodine.

Also, according to the present invention, there are provided herbicidal compositions comprising a carrier, an herbicide adjuvant and a toxic or growth-inhibiting amount of an α-haloacetanilide of the formula as described above.

Also, according to the present invention, there are provided methods for affecting plant systems, i.e., germinating seeds and emerging plant seedlings, in a manner to prevent the growth of said seeds and said emerging seedlings and destroy the same by the application of a toxic or growth-inhibiting amount of an α-haloacetanilide of the formula as described above.

Further, according to the present invention, there are provided, as new compounds, α-haloacetanilides of the formula as described above.

The α-haloacetanilides of this invention have a single substituent substituted on the aromatic ring in only an ortho position with respect to the amide nitrogen atom. There are no substituents on either the amide nitrogen atom or the other positions on the aromatic ring. The substituent, R in the formula above, is a tertiary alkyl radical having at least 4 carbon atoms and, preferably, not more than 10 carbon atoms. This tertiary alkyl radical may also have further chain branching. Examples of some suitable tertiary alkyl radicals include: tert-butyl, tert-amyl, 1,1,2-trimethylpropyl, 1,1-dimethylbutyl, 1,1-dimethylamyl, 1,1,2-trimethylbutyl, 1,1,3-trimethylbutyl, 1,1,3,3-tetramethylbutyl, 1,1,2,3-tetramethylbutyl, 1,1,2,2-tetramethylbutyl and 1,1-dimethyloctyl groups.

The halogen substituent on the α-carbon atom of the haloacetanilide, identified by X in the formula above, may be either a chlorine, bromine, or iodine atom.

The α-haloacetanilides of this invention may in general be prepared by haloacetylation of suitable ortho-substituted aromatic amines, which may be prepared for example, by the process disclosed in application S.N. 824,455, filed July 2, 1959 now abandoned, from a primary aromatic amine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction mediums or mediums cotnaining water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the haloacetylation reaction, it is also desirable to have an acid acceptor present in the reaction zone to neutralize the acid formed. Suitable acid acceptors for anhydrous solvent systems, include the ortho-substituted aromatic amine reactants, which may be present in the reaction zone in an amount greater than that required for the acetylation, tertiary amines, and pyridine. Acid acceptors in aqueous solvent systems include alkali or alkaline earth hydroxides and alkali or alkaline earth metal carbonates or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although sub-atmospheric pressure and super-atmospheric pressure can be used. Although the haloacetylation reaction can be carried out using stoichiometric amounts of reactants, it is usually preferable to use from 2 to 5% of an excess of the acetylating agent. The acetanilide products may be sepaarted from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

Example 1

In this example, 2'-tert-butyl-2-chloroacetanilide was prepared by reacting 30 g. (0.2 mole) of 2-tert-butylaniline dissolved in 100 ml. of hexane with 58 ml. of a 40% solution of chloroacetic anhydride. The reaction was exothermic and 10 minutes after the addition of the chloroacetic anhydride was completed, 100 ml. of water was added. The solvents were removed by evaporation of the reaction mixture overnight. The residue obtained was filtered and the filter cake washed several times with water. The filter cake was dissolved in 75% methanol and crystallization of the 2'-tert-butyl-2-chloroacetanilide effected by cooling. After washing the product with cold methanol and drying, 15 g. of the product was obtained having a melting point of 97.97° C. Analysis of the product was found to be 15.72% chlorine as compared with the calculated value of 15.78% chlorine. The proposed structure for the product was confirmed by inspection of the infrared spectrum.

Example 2

In this example, 2-chloro-2'-(1,1-dimethylpropyl)acetanilide was prepared by reacting 16.3 g. (0.1 mole) of 2-(1,1-dimethylpropyl)aniline dissolved in 100 ml. of heptane with 25 ml. of chloroacetic anhydride in chloroform. The reaction was exothermic and additional heating was unnecessary. After the reaction had subsided, the reaction mixture was washed with water and evapoarted to remove the heptane solvent. The residue obtained was dissolved in methanol, diluted with water, and placed in an ice-box to effect crystallization of 18 g. of flesh-colored crystals having a melting point of 71–71.6° C. and identified as 2-chloro-2'-(1,1-dimethylpropyl)acetanilide.

Example 3

In this example, 2-bromo-2'-tert-butylacetanilide was prepared by reacting 29.8 g. (0.2 mole) of 2-tert-butylaniline dissolved in 250 g. of anhydrous benzene with 40.4 g. (0.2 mole) of bromoacetyl bromide. The bromoacetyl bromide was added with stirring to the 2-tert-butylaniline solution, which also contained 20 g. of pyridine, over a period of 10 minutes with the temperature of the reaction mixture rising to 65° C. After the addition of the bromoacetyl bromide was completed, the reaction mixture was stirred for an additional 10 minutes and the product washed twice with water. After evaporating the solvents under a hood, the 2-bromo-2'-tert-butylacetanilide was crystallized from dilute methanol as fine tan needles. Upon recrystallization from methanol, 30.5 g. of the product was obtained having a melting point of 112.8–113.4° C.

Example 4

In this example, 2-chloro-2'-(1,1-dimethylbutyl)acetanilide prepared by reacting 89.4 g. (0.5 mole) of 2-(1,1-dimethylbutyl)aniline, dissolved in 200 ml. of benzene with 90 g. of chloroacetic anhydride in chloroform. The chloroacetic anhydride solution was added over a period of 10 minutes followed by gentle heating of the reaction mixture for 15 minutes. Thereafter, 250 ml. of water was added to the reaction mixture and the solvents removed by distillation. Upon sitting all night, the product became solid. The water was removed by decantation and the solid material washed once with water and dissolved in 500 ml. of hot methanol. The mixture obtained was filtered and the filtrate diluted with water. Crystallization of the 2 - chloro-2'-(1,1-dimethylbutyl)acetanilide was effected in an ice-box. After washing the product with 80% cold methanol solution and drying, 95 g. of the product was obtained having a melting point of 75.2–76° C. Analysis of the product was found to be 13.77% chlorine as compared with the calculated value of 13.97% chlorine.

Example 5

In this example, 2'-tert-butyl-2-iodoacetanilide was prepared by reacting 75 g. (0.5 mole) of 2-tert-butylanaline dissolved in 400 ml. of benzene with 88 g. (0.43 mole) of iodoacetyl chloride. The iodoacetyl chloride was added to the 2-tert-butylaniline solution, which also contained 50 g. of pyridine, with the formation of a vigorous reaction. After permitting the reaction mixture to set for 10 minutes, 500 ml. of a warm 2% sodium thiosulfate solution was added to form 3 layers. The upper or benzene layer was decanted, washed with water, filtered, and evaporated in the hood. The dark colored residue obtained was heated with heptane. The dark brown colored material was separated from the heptane solution by decantation. The heptane layer was filtered hot and crystallization effected by cooling. The product obtained was recrystallized from dilute methanol to obtain the 2'-tert-butyl-2-iodoacetanilide as tan cystals having a melting point of 97.5–98° C.

Example 6

In this example, the pre-emergent herbicidal ratings of some of the ortho-substituted α-haloacetanilides of this invention were determined in greenhouse tests in which a specific number of seeds of 12 different plants, each respresenting a principal botanical type, were planted in greenhouse flats. A good grade of top soil was placed in either 9½″ x 5¾″ x 2¾″ or 9″ x 13″ x 2″ aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, and wild oat; approximately 20 to 30 (a volume measure) of each of pigweed and crab grass; and either 2 or 3 seeds of soybean. Two different type plantings were made; one wherein the herbicidal composition was applied to the surface of the soil and the other wherein the composition was admixed with or incorporated in the top layer of soil. In the surface-application plantings, the seeds were arranged with 3 soybean seeds across the center of the large aluminum pan, the monocotyledon or grass seeds scattered randomly over one-third of the soil surface, and the diocotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application planting prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½ inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0—No phytotoxicity
    1—Slight phytotoxicity
    2—Moderate phytotoxicity
    3—Severe phytotoxicity The pre-emergent herbicidal activity of some of the ortho-substituted α-haloacetanilides of this invention are recorded in Table I for various application rates of the α-haloacetanilide in both surface and soil-incorporated applications. In Table I, the various seeds are represented by letters as follows:

A—General grass
    B—General broadleaf
    C—Morning glory
    D—Wild oats
    E—Brome grass
    F—Rye grass
    G—Radish
    H—Sugar beet
    I—Foxtail
    J—Crab grass
    K—Pigweed
    L—Soybean
    M—Wild buckwheat
    N—Tomato
    O—Sorghum Individual injury ratings for each plant type are reported in Table I. In addition, the total injury rating for all grass plants and the total injury rating for all broadleaf plants are also reported in Table I. For grasses, the maximum total is 18 for the 6 grass plants at ratings of 3. For broadleafs, the maximum total is 21 for the 7 broadleaf plants at ratings of 3.

The data in Table I illustrate primarily the selective herbicidal activity but also the general herbicidal activity of some of the ortho-substituted α-haloacetanilides of this invention. It will be noted that haloacetanilides substituted with a tertiary alkyl group ortho to the amide nitrogen atom and no other substitution demonstrate very outstanding selective herbicidal activity. It will also be noted from the data in Table I that general herbicidal activity can be obtained at higher levels of application. The grass specificity is achieved at fairly low application rates, for example, at rates as low as 5 lbs./acre so that very economical treatment is possible. The three botanical types or genera of grasses effectively controlled by the ortho-substituted α-haloacetanilides of this invention embrace a large number of undesirable plants, or weeds, frequently found in vegetable crops. But these α-haloacetanilides are not limited to removing grasses from broadleaf plants since the selective action is such that certain genera of grasses can be removed from corn, which is also a genus of grass. These α-haloacetanilides are also effective in killing nut grass, i.e., *Cyperus rotundus* and *Cyperus esculentus*.

TABLE I.—PRE-EMERGENCE HERBICIDAL ACTIVITY OF THE ORTHO-SUBSTITUTED α-HALOACENTANILIDES

[Surface application]

| Compound | Rate, lb./acre | Plant type | | | | | | | | | | | | | | Total Injury rating | |
|---|---|---|---|---|---|---|---|---|---|---|---|---|---|---|---|---|---|
| | | A | B | C | D | E | F | G | H | I | J | K | L | M | N | O | Grass | Broadleaf |
| 2'-tert-butyl-2-chloroacetanilide | 5 | 3 | 1 | 1 | 3 | 3 | 3 | 0 | 2 | 3 | 3 | 2 | 0 | 0 | 2 | 3 | 18 | 7 |
| 2-chloro-2'-(1,1-dimethylpropyl)acetanilide | 25 | 3 | 2 | 1 | 3 | 3 | 3 | 1 | 3 | 3 | 3 | 3 | 0 | 2 | 2 | 3 | 18 | 12 |
| | 5 | 3 | 0 | 0 | 3 | 3 | 3 | 0 | 0 | 3 | 3 | 3 | 0 | 0 | 0 | 2 | 16 | 3 |
| 2-bromo-2'-tert-butylacetanilide | 25 | 3 | 0 | 0 | 3 | 3 | 3 | 0 | 1 | 3 | 3 | 3 | 1 | 2 | 0 | 1 | 16 | 7 |
| | 5 | 1 | 0 | 0 | 0 | 0 | 1 | 0 | 1 | 3 | 3 | 3 | 0 | 0 | 0 | 1 | 8 | 4 |
| 2'-tert-butyl-2-iodoacetanilide | 25 | 3 | 2 | 0 | 3 | 2 | 3 | 3 | 3 | 3 | 3 | 3 | 0 | 2 | 1 | 3 | 17 | 12 |
| | 5 | 3 | 0 | 0 | 2 | 3 | 3 | 0 | 1 | 3 | 3 | 3 | 0 | 0 | 0 | 3 | 17 | 4 |
| 2-chloro-2'-(1,1-dimethylbutyl)acetanilide | 5 | 2 | 1 | 0 | 1 | 0 | 2 | 0 | 2 | 3 | 3 | 3 | 1 | 0 | 0 | 2 | 11 | 6 |

*Example 7*

In this example, the lack of herbicidal activity of closely related compounds which do not have the structure of the ortho-substituted α-haloacetanilides of this invention is demonstrated. Pre-emergent greenhouse tests were used in this example and the planting of the seeds was accomplished in the same manner as described in Example 6. The data obtained are reported in Table II wherein the identification of the seeds is the same as that of the previous example and the herbicidal ratings given also have the same definition.

In the first comparison reported in Table II, the critical nature of the positioning of the tertiary alkyl group on the aromatic ring is very effectively demonstrated. Thus, a general grass rating of 3 and a general broadleaf rating of 1 was obtained at an application rate of 5 lbs./acre for a chloroacetanilide of this invention having a tert-butyl group located in the ortho position with respect to the amide nitrogen atom whereas no herbicidal activity was observed at an application rate of 25 lbs./acre, an application rate 5 times greater than the application rate of the compound of this invention, for an acetanilide having a tert-butyl group located in the para position instead of the ortho position with respect to the amide nitrogen atom. It will be appreciated in this comparison that the alkyl substituents are exactly the same, the only difference in the respective α-chloroacetanilides being in the location of these alkyl groups with respect to the amide nitrogen atom.

atom. In order to have high unit herbicidal activity and selectivity, the α-haloacetanilide must be one which has a tertiary alkyl group ortho with respect to the amide nitrogen atom and no other substituents on the amide nitrogen atom. Also, only the mono-halogen substituted acetanilides have these outstanding herbicidal activities; the di- and tri-halogen derivatives are completely inactive at the same rates of application.

The herbicidal compositions of this invention are either particulate solid (i.e., dust) or liquid concentrate compositions comprising the active ingredient and either a particulate solid or liquid herbicidal adjuvant which are TABLE II.—COMPARISON OF PRE-EMERGENCE HERBICIDAL ACTIVITY OF VARIOUS α-HALOACETANILIDES

| Compound | Plant Type | | | | | | | | | | | | | | | Total Injury Rating | | Comments |
|---|---|---|---|---|---|---|---|---|---|---|---|---|---|---|---|---|---|---|
| | A | B | C | D | E | F | G | H | I | J | K | L | M | N | O | Grass | Broadleaf | |
| 2'-tert-butyl-2-chloroacetanilide | 3 | 1 | 1 | 3 | 3 | 3 | 0 | 2 | 3 | 3 | 2 | 0 | 0 | 2 | 3 | 18 | 7 | At 5 lb./acre. |
| 4'-tert-butyl-2-chloroacetanilide | 0 | 0 | 0 | 0 | 0 | 0 | 0 | 0 | 0 | 0 | 0 | 0 | 0 | 0 | 0 | 0 | 0 | At 25 lb./acre. |
| 2'-tert-butyl-2-chloroacetanilide | 3 | 1 | 1 | 3 | 3 | 3 | 0 | 2 | 3 | 3 | 2 | 0 | 0 | 2 | 3 | 18 | 7 | At 5 lb./acre. |
| 2-chloro-2'-isopropylacetanilide | 0 | 0 | 0 | 0 | 1 | 0 | 0 | 0 | 0 | 2 | 0 | 0 | 0 | 0 | 0 | 3 | 0 | Do. |
| 2'-tert-butyl-2-chloroacetanilide | 3 | 1 | 1 | 3 | 3 | 3 | 0 | 2 | 3 | 3 | 2 | 0 | 0 | 2 | 3 | 18 | 7 | At 5 lb./acre. |
| 2-tert-butylacetanilide | 0 | 0 | 0 | 0 | 0 | 0 | 0 | 0 | 0 | 0 | 0 | 0 | 0 | 0 | 0 | 0 | 0 | At 25 lb./acre. |
| 2'-tert-butyl-2-chloroacetanilide | 3 | 1 | 1 | 3 | 3 | 3 | 0 | 2 | 3 | 3 | 2 | 0 | 0 | 2 | 3 | 18 | 7 | At 5 lb./acre. |
| 2'-tert-butyl-2,2'-dichloroacetanilide | 0 | 0 | 0 | 0 | 0 | 0 | 0 | 0 | 0 | 0 | 0 | 0 | 0 | 0 | 0 | 0 | 0 | At 25 lb./acre. |
| 2'-tert-butyl-2,2,2-trichloroacetanilide | 0 | 0 | 0 | 0 | 0 | 0 | 0 | 0 | 0 | 0 | 0 | 0 | 0 | 0 | 0 | 0 | 0 | Do. |
| 2'-tert-butyl-2-chloroacetanilide | 3 | 1 | 1 | 3 | 3 | 3 | 0 | 2 | 3 | 3 | 2 | 0 | 0 | 2 | 3 | 18 | 7 | At 5 lb./acre. |
| 2',N-di-tert-butyl-2-chloroacetanilide | 0 | 0 | 0 | 0 | 0 | 0 | 0 | 0 | 0 | 0 | 0 | 0 | 0 | 0 | 0 | 0 | 0 | Do. |
| 2'-tert-butyl-2-iodoacetanilide | 3 | 0 | 0 | 2 | 3 | 3 | 0 | 1 | 3 | 3 | 3 | 0 | 0 | 0 | 3 | 17 | 4 | Do. |
| N-tert-butyl-2-iodoacetanilide | 0 | 0 | 0 | 0 | 0 | 0 | 0 | 0 | 0 | 0 | 2 | 0 | 0 | 0 | 0 | 0 | 2 | Do. |

The necessity for a tertiary alkyl group instead of a secondary alkyl group in the ortho position with respect to the amide nitrogen atom is demonstrated in the second comparison reported in Table II. In this comparison a chloroacetanilide having a tert-butyl group substituted in the ortho position was compared with an α-chloroacetanilide having an isopropyl group substituted in the same position. At the application rate of 5 lbs./acre, a general grass rating of 3 and a broadleaf rating of 1 was obtained for the compound having the tert-butyl substituent whereas almost no phytotoxicity was observed for the compound having the isopropyl substituent.

The third comparison in Table II demonstrates the effect of removing the chloro group from the α-haloacetanilide. No phytotoxicity was observed with the non-halogenated compound at any rate of application, not even at the extremely heavy rate of 25 lbs./acre.

Since the previous comparison demonstrates the necessity for a halogen substituent, the next comparison in Table II was arranged to determine the effect of di- and tri-substitution of halogen groups. Surprisingly, neither the di-chloro nor the tri-chloro derivatives demonstrated any herbicidal activity at the heavy rate of 25 lbs./acre. Therefore, only the monohalo derivative is active as a herbicide.

In the next comparison reported in Table II, a tertiary alkyl group was substituted on the amide nitrogen atom in addition to the tertiary alkyl group substituted in the ortho position on the aromatic ring as in the acetanilides of this invention. Thus, the substitution of a tertiary butyl group on the amide nitrogen atom of the 2'-tert-butyl-2-chloroacetanilide of this invention resulted in the complete destruction of the herbicidal activity of the acetanilide of this invention at an application rate of 5 lbs./acre.

The last comparison reported in Table II demonstrates that the tertiary alkyl group may not be removed from the aromatic ring and substituted on the amide nitrogen atom. As reported, an α-iodoacetanilide having a single tert-butyl substituent on the amide nitrogen atom has almost no herbicidal activity at an application rate of 5 lbs./acre whereas the corresponding α-iodoacetanilide having a tert-butyl group located on the aromatic ring in the ortho position has very severe phytotoxicity at the same rate of application.

The data in this example very clearly demonstrate the critical effect of not only the nature of the alkyl substituent but also its location with respect to the nitrogen formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the α-haloacetanilides of this invention.

In general, the α-haloacetanilides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspended in the extending agent as a suspension or emulsion. Also, the α-haloacetanilides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the α-haloacetanilides of this invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz diatomaceous earth, fuller's earth, chalk, rock phosphate, kaolin, kiselghur, volcanic ash, salt, and sulfur; the chemically modified minerals, such as acid-washing bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely-divided form, preferably in a size as small as 100 mesh or smaller.

The surface active agent, that is the wetting, emulsifying, or dispersing agent, used in the herbicidal composition of this invention to serve in providing uniform dispersions of all formulation components of both liquid and dust types in both the concentrate compositions and the toxicant compositions applied, may be either anionic, cathionic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensed with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate compositions. The remainder of the composition is the liquid extending agent.

Use of the surface active agent is necessary in the formulation of liquid concentrate compositions in order to obtain a composition containing a sufficient concentration of the difficulty soluble α-haloacetanilide in the liquid extending agent. However, the liquid extending agent must be selected not only on the basis of the amount of the α-haloacetanilide dissolved but also upon the basis of the solution temperature of the total composition. Thus, in some formulations, a particular combination of solvents give a sufficiently low solvent temperature but the amount of the α-haloacetanilide dissolved or dispersed in the mixture is insufficient and a suitable surface active agent must be selected in order that more α-haloacetanilide can be dispersed in the composition. Preferably, the concentrate composition has a solution temperature below 0° C. although compositions having solution temperatures as high as 20° C. can be used.

The concentration of α-haloacetanilide in the particulate solid or dust concentrate composition of this invention may vary over wide ranges depending upon the nature of the solid extending agent and the intended use of the composition. Since the α-halo acetanilides of this invention have very high toxicities and are applied at very low rates, the concentration of the active ingredient in the dust composition may be very low and may comprise as little as 1% or less by weight of the total dust composition; however, a concentration in the range of 5% to 98% by weight of the total composition is preferred. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by weight of the composition.

The carrier material, used for the uniform distribution of the α-haloacetanilide in an herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to emerging seedlings by the use of power-dusters, broom, and hand sprayers, and spray-dusters. The compositions can also be very suitably applied from airplanes as a dust or a spray because the herbicidal compositions of this invention are effective in very low dosages. In preventing growth of germinating seeds or emerging seedlings, the dust and liquid compositions are applied to the soil according to conventional methods, and, preferably, distributed in the soil to a depth of at least ½-inch below the soil surface. It is not absolutely necessary that the herbicidal compositions be admixed with the soil particles and these compositions can be applied merely by spraying or sprinkling on to the surface of the soil.

The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the α-haloacetanilide to the plant system is essential in the practice of the present invention. The exact dosage to be applied is dependent not only upon the specific α-haloacetanilide but also upon the particular plant species to be controlled and the stage of growth thereof as well as the part of the plant to be contacted with the toxicant. These herbicidal compositions are usually applied at a rate in the range of 1 to 25 lbs. per acre or higher. It is believed that one skilled in the art can readily determine from this disclosure, including the examples, the optimum rate to be applied in any particular case.

Although the active ingredient in the herbicidal compositions of this invention is preferably an ortho-substituted α-haloacetanilide as described in this specification, other α-haloacetanilides having nuclear alkyl substitution and/or halo substitution in other than the ortho positions and/or having amide nitrogen substitution may also be present in the herbicidal compositions and contribute to the activity of the composition. However, the essential active ingredient of the herbicidal compositions of this invention is the ortho-substituted α-haloacetanilide disclosed in this specification. Of course, one skilled in the art will understand that mixtures of various ortho-substituted α-haloacetanilides can also be used.

Reasonable variation and modification of the invention as described are possible, the essence of which is that there have been provided (1) herbicidal concentrate compositions comprising an herbicidal adjuvant and, as an essential active ingredient, an ortho-substituted α-haloacetanilide, (2) herbicidal toxicant compositions comprising an herbicidal adjuvant, a carrier, and, as an essential active ingredient, a toxic or growth-inhibiting amount of an ortho-substituted α-haloacetanilide, (3) methods for suppression and control of undesirable vegetation, such as germinating seeds and emerging seedlings, by the application of an ortho-substituted α-haloacetanilide thereto, and (4) certain ortho-substituted α-haloacetanilides as new compounds.

I claim:
1. A method for preventing plant growth which comprises applying to soils normally supporting said growth a growth-inhibiting amount of an α-haloacetanilide of the formula

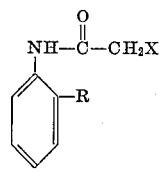

wherein R is tertiary alkyl having at least 4 carbon atoms and X is an halogen atom selected from the group consisting of chlorine, bromine, and iodine.

2. A method for preventing the undesirable growth of plants which comprises distributing on the surface of soil containing seeds of said plants a growth-inhibiting amount of an α-haloacetanilide of the formula

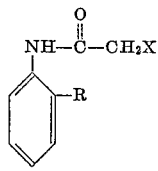

wherein R is tertiary alkyl having at least 4 carbon atoms and X is an halogen atom selected from the group consisting of chlorine, bromine, and iodine.

3. A method for preventing the undesirable growth of plants which comprises intimately admixing soil containing seeds of said plants with a growth-inhibiting amount of an α-haloacetanilide of the formula

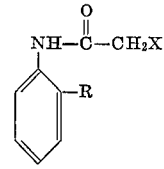

wherein R is tertiary alkyl having at least 4 carbon atoms, and X is a halogen atom selected from the group consisting of chlorine, bromine, and iodine.

4. A method for preventing the undesirable growth of plants which comprises contacting the seeds of said plants positioned in the soil with a growth-inhibiting amount of an α-haloacetanilide of the formula

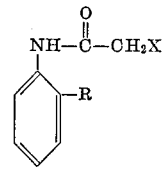

wherein R is tertiary alkyl having at least 4 carbon atoms and X is an halogen atom selected from the group consisting of chlorine, bromine, and iodine.

5. A method for preventing the undesirable growth of plants which comprises impregnating the soil with a growth-inhibiting amount of an α-haloacetanilide of the formula

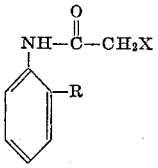

wherein R is tertiary alkyl having at least 4 carbon atoms and X is an halogen atom selected from the group consisting of chlorine, bromine, and iodine.

References Cited
UNITED STATES PATENTS
2,863,752 12/1958 Hamm et al. _____ 71—2.3
3,010,996 11/1961 Litvan et al. _____ 260—562 X

FOREIGN PATENTS
139,051 2/1953 Sweden.

LEWIS GOTTS, Primary Examiner.

JULIUS S. LEVITT, JAMES O. THOMAS, Jr.,
Examiners.